United States Patent [19]
Commanda

[11] Patent Number: 4,480,709
[45] Date of Patent: Nov. 6, 1984

[54] FLUID POWERED GENERATOR

[76] Inventor: Ephrem E. Commanda, P.O. Box 748, Sturgeon Falls, Ontario, Canada, P0H 2G0

[21] Appl. No.: 377,463

[22] Filed: May 12, 1982

[51] Int. Cl.³ .......................................... B60K 25/10
[52] U.S. Cl. .................................. 180/65.3; 267/8 R; 417/233; 417/534
[58] Field of Search .............. 417/233, 534; 180/65 B, 180/65 C, 65 D, 165; 267/8 R, 139, 64.15, 64.25; 188/322.12

[56] References Cited

U.S. PATENT DOCUMENTS

| | | | |
|---|---|---|---|
| 1,337,057 | 4/1920 | Edwards | 417/534 |
| 2,601,551 | 6/1952 | Navarro et al. | 267/65 |
| 2,967,066 | 1/1961 | Mueller | 280/668 X |
| 3,211,444 | 10/1965 | Avner | 267/8 R |
| 3,507,580 | 4/1970 | Howard et al. | 417/231 |
| 3,806,105 | 4/1974 | Konishi et al. | 267/139 X |
| 3,921,746 | 11/1975 | Lewus | 417/231 X |
| 3,980,152 | 9/1976 | Manor | 417/231 X |
| 4,137,020 | 1/1979 | Ito et al. | 417/534 |
| 4,159,105 | 6/1979 | Laan et al. | 267/8 R |
| 4,295,538 | 10/1981 | Lewus | 180/165 |

FOREIGN PATENT DOCUMENTS 1653411  9/1971  Fed. Rep. of Germany ...... 417/534

Primary Examiner—Joseph F. Peters, Jr.
Assistant Examiner—Michael Mar
Attorney, Agent, or Firm—Leonard Bloom

[57] ABSTRACT

A fluid powered generator mounted on a vehicle or the like including a cylinder depending from one arm of an A frame via an enclosing cap, a sealed tube extending upwardly from another arm of the A frame and tightly and slidably disposed within a hollow of the cylinder, a closed chamber formed between the sealed tube and a top portion of the cylinder serving as a first damping device, a piston disposed within the sealed tube having a stem portion extending therewithout and depending from one arm of the A frame, and a plurality of valves above and below a piston face provided with suitable conduits to effect the ingress and egress of fluids above and below the piston in response to changes in the distance between the upper and lower arms.

2 Claims, 1 Drawing Figure

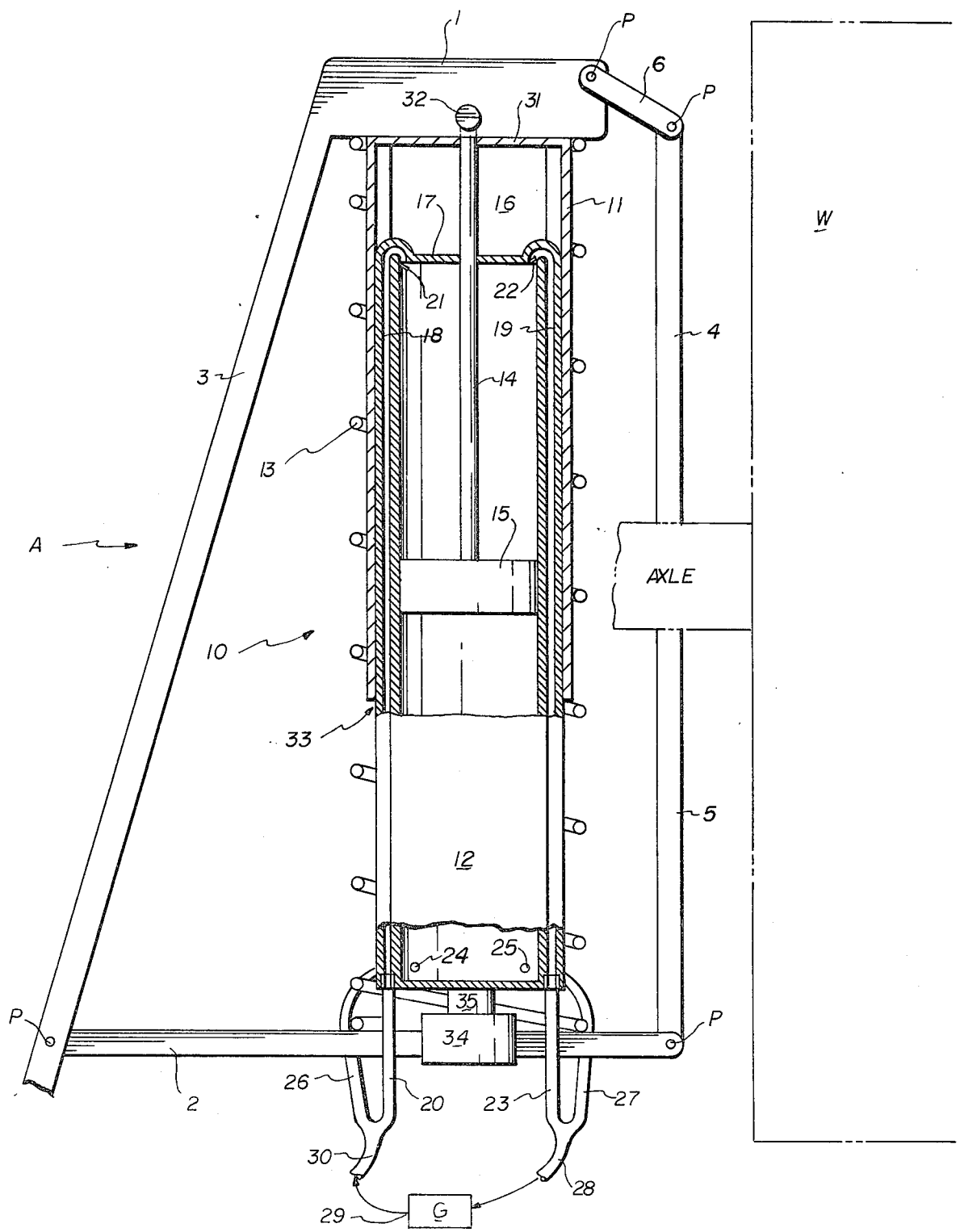

FLUID POWERED GENERATOR

BACKGROUND OF THE INVENTION

The following invention relates generally to devices for extracting energy by converting an oscilatory motion into suitable fluid pressure, and thereafter transferring same into work done by a generator, turbine or the like.

With the advent of hybrid engines, that is engines that use more than one source or mode of power, an increasing awareness and therefore a greater need has presented itself for the utilization of all types of energy that are bountiful and readily available in the normal operation of a vehicle, many components of which have been wasted and dissipated into the atmosphere in the form of heat or the like.

One such area that is receiving greater attention now that one element of a hybrid car includes an electrical component is the suspension system since heretofore most energy generated by a suspension system has not been harnassed for a variety of reasons, one of which includes poor engineering, and another, insufficient need until now.

The following patents reflect the state of the art of which applicant is aware insofar as these patents appear to be germane to the process at hand:

| | | |
|---|---|---|
| 2,601,551 | M. Navarro et al | June 24, 1952 |
| 3,507,580 | L. H. Howard et al | April 21, 1970 |
| 3,921,746 | A. Lewus | Nov. 25, 1975 |
| 3,9801152 | R. Manor | Sept. 14, 1976 |
| 4,295,538 | A. Lewus | Oct. 20, 1981 |

Thus, according to the patents to Lewus, it is generally known to use a suspension and auxiliary power system for a vehicle which includes a frame, a power consuming load on the frame and at least one supporting wheel which is adapted vertically relative to the frame. The system includes a fluid pump connected between the frame and the wheel and includes a piston which is reciprocated in response to relative movement between the frame and the wheel to contract or expand a fluid chamber. A fluid circuit connected to the pump includes a unidirectional fluid motor which drives a power consuming load. The fluid circuit is connected to the fluid chamber of the pump and includes a check valve for permitting fluids to flow only from the chamber directly to the motor. A second check valve in the circuit regulates the flow so that the fluid is directed only from a source of fluid to the chamber. The fluid pump acts as a hydraulic suspension system supporting at least a part of the vehicle weight, whereby loading of the motor causes the motor to serve as a shock absorber for the pump.

Similarly, the patent to Howard et al teaches the use of a known technique in which a generator, placed on a suspension member of a vehicle frame, translates the motion of a piston within the generator to pump air into an air reservoir, and appropriate valving is provided to run different accessories on board.

The remaining citations appear to be of general interest.

By way of contrast, the instant application is directed to an instrumentality which is not as susceptable to the damage likely in systems according to known prior art techniques. With municipalities attempting to save money and being unable to maintain highways in the best condition of repair, shock absorbers according to these known prior art devices are susceptable to damage when the length of travel required exceeds their dimensional and structural capabilities. For example, in The Howard et al device there appear to be only two load bearing surfaces associated with dissipating forces imposed by the road on the two moving parts, that is, the piston's reaction to the spring: the face of the piston as it abuts against the cylinder wall and the bearing 64's capability of withstanding torsional displacement as a function of road vibration. Sudden severe road changes may cause the stub portion 70 on the top of the piston to damage the generator itself; or lateral torsion by the limited bearing surface of the piston against the cylinder wall and the bearing surface 64 causes distortion and ultimate failure of the system.

By way of contrast, the instant application includes a cylinder having an open hollow end and another end provided with a cap, which cap depends from one arm of a frame, a sealed tube extending upwardly within the hollow of the depending cylinder, thereby defining a closed chamber between the top of the sealed tube and the capped top portion of the cylinder, the sealed tube including therein a piston instrumentality having a stem portion extending outwardly and dependingly supported by the one upper arm of the A-frame, and valve means associated above and below portions of the piston instrumentality in such a manner that relative motion of the piston to the sealed tube causes fluidic motion which ultimately generates power after traversing through a conduit system, and the closed chamber formed between the top of the sealed tube and the cap of the cylinder provides a substantially incompressible cushion which serves in combination with an annular overlying spiral spring to discourage exceeding the limit of the system by providing such a cushion.

OBJECTS AND SUMMARY OF THE INVENTION

Accordingly, this invention has as an objective to provide a new and improved fluid powered generator.

It is still a further object of this invention to provide a device of the character described above which is readily adaptable to existing vehicles, though not limited to motor vehicles per se.

It is still a further object of this invention to provide a device of the character described above which is relatively inexpensive to manufacture, simple to install, be easily retrofitted on existing vehicles.

It is still a further object of this invention to provide a device of the character described above which lends itself to mass production techniques.

It is still a further object of this invention to provide a device of the character described above which is extremely durable in construction and in use.

It is still a further object of this invention to provide a device of the character described above in which a power output can be effected therefrom to thereby make more practical hybrid type of vehicles than the prior art would suggest.

These and other objects will made manifest when considering the following detailed specification when taken in conjunction with the appended drawing FIGURE.

BRIEF DESCRIPTION OF THE DRAWINGS

The sole FIGURE is a side view partially in section of the apparatus according to the present invention.

BRIEF DESCRIPTION OF THE PREFERRED EMBODIMENT

Referring to the drawing now wherein like reference numerals refer to like part thoughout the drawing FIGURE, reference numeral 10 is directed to the fluid generator according to the present invention.

The generator 10 can be seen as being disposed between upper and lower arms of an "A" type frame, the upper arm of the "A" frame having the reference numeral 1, the lower arm 2 and an angled side arm 3 communicating on a side opposite from vertical arm 4 having a final pivot arm 6, all arms pivotally connected except for the rigid interconnection between arms 1 and 3. The pivots P join arms to define a closed structure which includes (clockwise) arms 3,1,6,4 and 2. The vertical arms 4 is operatively connected to an axle in a well-known manner, the axle continuing thereafter to an outboard wheel that is generally depicted.

Extending between the upper arm 1 and the lower arm 2 there is, in a preferred form of the invention, a depending cylinder 11 having a cap 31 attached to a lower face of the upper arm 1. Thus, an open end 33 of the cylinder 11 faces in a negative vertical direction.

The lower arm has affixed thereon an upwardly extending closed chamber 12 having a bottom support platform 34 fixed in the arm 2 and a stem 35 serving as a transition piece between the platform 34 and the sealed tube 12. The tube 12 is tightly disposed through the opening 33 formed on the hollow of the downwardly extending cylinder 11, and the tight frictional fit in combination with an annular surrounding spiral spring 13 that encompasses both the sealed tube 12 and the downwardly extending cylinder 11 encourages the upper and lower arms 1 and 2 to maintain a spaced relationship.

A top wall 17 of the sealed tube 12 in combination with the cap 31 of the cylinder and the top annular area of the cylinder defines a chamber 16 substantially closed from fluid communication from any source for purposes to be assigned hereinafter.

Extending through the chamber 16 and into the interior of the sealed tube 12 a piston stem 14 is pivotally disposed on the upper arm 1, the pivot 32 shown in the FIGURE. A terminal portion of the piston stems 14 ends in an annular piston 15 tightly disposed within the sealed tube's inner walls. An area above the piston 15 is provided with an inlet flap valve 21 and an outlet flap valve 22 communicating with inlet passage 18 and an outlet passage 19 respectively, the passages formed integrally with a double wall of the sealed tube so that the passageways 18, 19 extend from a top portion of the sealed tube downwardly and outwardly to a lowermost portion terminating in tubes 20 and 23 respectively.

A portion of the sealed tube below the piston 15 is provided with further inlet valve 24 and outlet valve 25 for similar purposes, these valves 24, 25 respectively communicating with inlet 26 and outlet 27, each forming respective branches. Thus, the outlet 23 and 27 coalesce to form a single outlet branch 28 directed to engage a generator G. After work having been done, the generator G provides an output 29 thereafter branching 30 to the inlet 26, 20. In this way, work can be done by having relative motion of the piston means 15 in relation to the sealed tube 12. In extreme situations, the travel of the piston may be so abrupt, that the frictional resistance between the tube 12 and the cylinder 11 is overcome and relief can be found from violent bumps by the cushion formed in the closed chamber 16 absorbing a portion of the load against spiral 13 as should now be evident.

Thus, in use and operation, normal translation of the piston 15 will cause migration up the passageway 18 out flap valve 21 and through passageway 26 through valve 24, and in an opposite sense, out of flap valve 22 thorugh passageway 19 and out of of valve 25 and through branch conduit 27 for purposes set forth herein above. Violent displacement will cause the cushion 16 to be temporarily called upon to dissipate the load. While the conduits and generator could conceivably be well suited for the pumping of pneumatic gases, it is also possible that liquids such as brake fluid could be used in this system.

Having thus described the invention it should be apparent that numerous structural modifications are contemplated as being a part of this invention as set forth hereinabove and as defined hereinbelow by the claims.

What is claimed is:

1. A liquid powered generator mounted on a vehicle suspension which includes an "A" type frame having two arms comprising in combination:
   - an open ended cylinder emanating from one arm of the A frame by an enclosing cap end wall of said cylinder;
   - a sealed tube filled solely with liquid extending from another arm of the A frame and tightly disposed within said cylinder for reciprocating movement therein;
   - biasing means provided outside said sealed tube and said cylinder and abutting against both of the arms;
   - a closed chamber formed between said sealed tube and a top portion of said cylinder serving as cushioning and damping means when air contained therein is compressed by said reciprocating movement;
   - piston means on the one arm extending into said sealed tube, said piston means including a piston stem depending from and pivoted to the one arm and terminating in an annular piston disc slidably disposed within said sealed tube;
   - valve means above and below portions of said piston means, said valve means including inlet and outlet valves in each upper and lower portion of said sealed tube providing a double action;
   - at least two passageways integrally formed with said sealed tube on a longitudinal periphery thereof and providing fluid communication such that said upper inlet and outlet valves transfer fluidic pulses from and to an area adjacent said lower inlet and outlet valves respectively;
   - conduit means including inlet conduits emanating from a first common branch conduit to one of said passageways and to said inlet valve in said lower portion of said sealed tube and outlet conduits coalescing into a second common branch conduit from another of said passageways and from said outlet valve in said lower portion of said sealed tube; and
   - a generator disposed between said second common conduit and said first common conduit.

2. The device of claim 1 wherein said valve means are flap valves.

* * * * *